March 19, 1963   J. W. WALLACE   3,081,654
MOTOR CONTROL APPARATUS
Filed Oct. 15, 1959
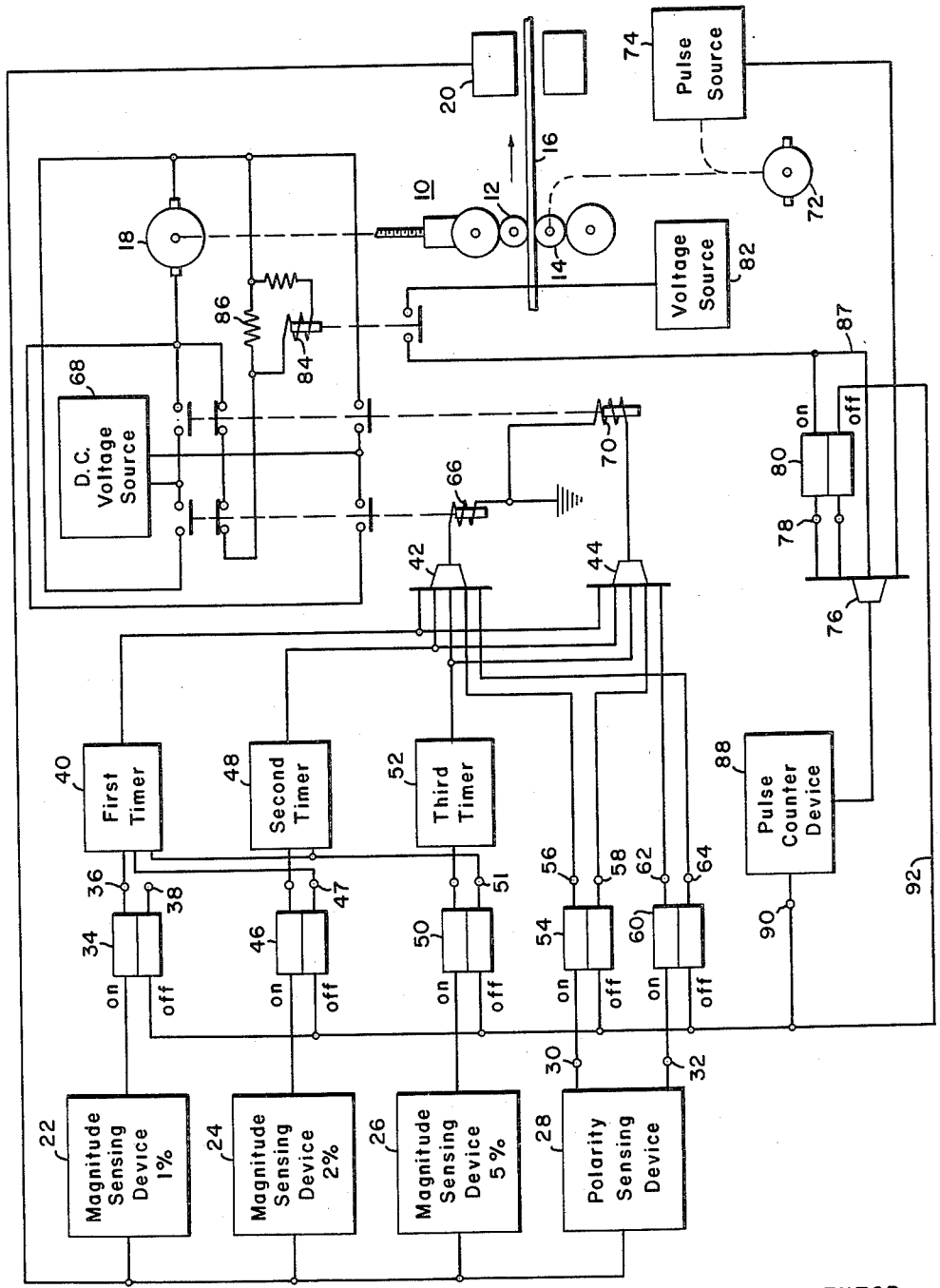
WITNESSES
John E. Heanley Jr.
James F. Young
INVENTOR
John W. Wallace
BY T.W. Brodahl
ATTORNEY

United States Patent Office 3,081,654
Patented Mar. 19, 1963

3,081,654
MOTOR CONTROL APPARATUS
John W. Wallace, Buffalo, N.Y., assignor to Westinghouse Electric Corporation, East Pittsburgh, Pa., a corporation of Pennsylvania
Filed Oct. 15, 1959, Ser. No. 846,638
4 Claims. (Cl. 80—56)

The present invention relates in general to automatic motor control apparatus for a machine device or the like, and more specifically relates to automatic motor control apparatus for a strip rolling mill wherein the thickness of the roll strip is measured and any error relative to a desired strip thickness results in an error signal that is employed to automatically control the operation of a motor operative with the rolling mill.

It is an object of the present invention to provide improved motor control apparatus for controlling the operation of a machine device, such as for example a metallic strip rolling mill.

It is another object to provide improved motor control apparatus for better controlling the operation of a metallic strip rolling mill regarding strip thickness error as a function of the length of that strip.

It is a different object of the present invention to provide improved motor control apparatus operative with a strip rolling mill or the like for better controlling an operational error condition in accordance with a predetermined timing program.

It is a still different object of the present invention to provide improved motor control apparatus operative with a strip rolling mill for better controlling an operational error condition of that rolling mill, and more particularly to better sense the magnitude of any operational error condition and to time the error correction in accordance with the movement of the strip through the rolling mill.

It is an additional object to provide improved motor control apparatus operative with a machine device for sensing an operational error of that machine device and to better control the operation of that machine device regarding the elimination of such operation error.

It is a still additional object to provide improved motor control apparatus operative with a machine device and in accordance with an operational error to better control the operation of that machine device regarding the correction or elimination of any such operational error as determined by the error sensing position and relative to the machine device operation.

These and other objects and advantages of the present invention will become still more apparent from a study of the following description taken in conjunction with the drawing which shows a schematic view of the motor control apparatus in accordance with the present invention.

In FIGURE 1 there is shown a strip rolling mill 10 including an upper roller 12 and a lower roller 14, operative with a continuous strip of metallic material 16, a screw down motor 18 is operative to adjust the spacing between the upper roller 12 and the lower roller 14 and thereby to control the thickness of the strip 16 leaving the mill stand 10. An X-ray thickness measuring gauge 20 or the like device is operative to provide an error signal in accordance with the difference between the actual thickness of the strip 16 and a predetermined desired or reference thickness. The operation of the thickness measurement gauge 20 in this regard is well known to persons skilled in this particular art.

The error signal supplied by the thickness gauge 20 is applied to a first signal sensing device 22 which is operative to provide an output signal only when the error signal reaches a predetermined magnitude or value such as 1% of the maximum error signal that is provided by the thickness gauge 20. A second signal sensing device 24 is responsive to the error signal from the thickness gauge 20 and is operative to provide an output signal only when the error signal reaches a greater predetermined magnitude or value such as a 2% thickness error. A third signal sensing device 26 is responsive to the error signal from the thickness gauge 20 and is operative to provide an output signal only when the error signal reaches a third and greater predetermined magnitude or value, for example a 5% error. A polarity sensing device 28 is operative with the error signal from the thickness gauge 20 to provide a first output signal to an output terminal 30 when the error signal indicates that the actual strip thickness is greater than the desired or reference strip thickness. The polarity sensing device 28 is operative to provide a second output signal to a second output terminal 32 when the error signal indicates that the actual strip thickness is less than the desired or reference strip thickness. The output signal from the signal magnitude sensing device 22 energizes an ON input of a memory logic device 34.

The memory logic device per se is well known to persons skilled in this particular art and is operative such that when its ON input receives an input signal, a first output terminal 36 is not energized with a unit value output signal and the second output terminal 38 is so energized. When the OFF input terminal of the memory device 34 is energized by an input control signal, the output terminal 36 receives the unit value output signal and the output terminal 38 is not energized or receives a zero value output signal. The memory device 34 is a binary type device providing at each of its output terminals either a unit value output signal or a zero value output signal.

When the magnitude sensing device 22 senses a 1% error signal from the thickness gauge 20 it provides an output signal to the ON terminal of the memory device 34 which in turn terminates a unit value output signal previously provided to the terminal 36 which is connected to the input of a first timer device 40. The timer device 40 is operative to provide no output signal or a zero value output signal for as long as a control input of that timer device is energized by an input signal, and then for a predetermined time period only it provides a unit value output signal after which time period it again provides the zero value output signal. This type of timer device is per se well known to persons skilled in this particular art. This timer device also has a lockout input which is operative to hold off its unit value output signal for as long as a lockout signal is applied to its lockout input.

A well known timing relay will operate in this manner, for example. It may have a set of contacts that are picked up and held open for as long as its control winding is energized by either an input control signal or an input lockout signal. When neither of these input signals are provided, after a predetermined time period that can be determined by a charged capacitor the contacts close and the timing relay provides an output signal through those closed contacts. The output of the first timer device is connected to one input terminal of each of a first NOR logic device 42 and a second NOR logic device 44.

It should be noted that a NOR logic device per se is well known to persons skilled in this particular art and is operative to provide a unit value output signal only when all of its input terminals are simultaneously not energized by a unit value input signal.

The output of the magnitude sensing device 24 is connected to the ON input terminal of a memory device 46 which is shown as the upper input terminal and that memory device 46 in turn is connected to energize a second timer device 48 having its output connected to an input of each of the NOR logic devices 42 and 44. The signal magnitude sensing device 26 is connected to energize the ON input of a memory device 50 that in turn is connected to energize an input of a third timer device 52 having an output connected to one input of each of the NOR logic devices 42 and 44.

The signal polarity sensing device 28 has its output terminal 30 connected to the ON input of a memory device 54 having a first output terminal 56 connected to energize an input of the NOR logic device 42 and a second output terminal 58 connected to energize an input of the NOR logic device 44. The output terminal 32 of the signal polarity sensing device 28 is connected to energize the ON input of the memory device 60 having a first output terminal 62 connected to energize an input of the NOR logic device 44 and a second output terminal 64 connected to energize an input of the NOR logic device 42.

The NOR logic device 42 is connected to control the operation of a DOWN relay 66 having contactors connected in a motor control circuit with the screw motor 18 and a direct current voltage source 68 such that when the DOWN relay 66 is energized, its contactors cause the screw motor 18 to operate in a direction to decrease the spacing between the upper roller 12 and lower roller 14 of the rolling mill 10. The NOR logic device 44 is operative with an UP relay device 70 having contacts operative between the D.C. voltage source 68 and the screw motor 18 such that when the UP relay device 70 is energized, the screw motor 18 is caused to move in a direction to increase the spacing between the upper roller 12 and the lower roller 14 of the rolling mill 10. The latter operation is believed to be readily apparent from the illustrated motor control circuit.

A mill motor 72 is connected to drive the rolling mill 10 and in addition is connected to a pulse source 74 such that the output pulses from the pulse source 74 have a frequency proportional to the operating speed of the rolling mill 10, and therefore the movement of the strip 16. The output pulses from the pulse source 74 are connected to an input of a NOR logic device 76, a second input of the same NOR logic device is connected to be energized by an output terminal 78 of a memory device 80 having an ON input connected to be energized by a voltage source 82 through a relay device 84 having a contactor connected between the voltage source 82 and the ON input terminal of the memory device 80. The relay device 84 is connected in the armature circuit of the screw motor 18 such that when each of the DOWN relay device 66 and the UP relay device 70 are not energized, and the screw motor 18 is generating or operating in a dynamic braking circuit arrangement, the resulting current flow through a dynamic braking resistor 86 will provide a voltage drop across the dynamic braking resistor 86 to cause the relay device 84 to be energized. After the screw motor 18 has stopped its dynamic braking operation such that the screw motor 18 has effectively stopped its motion, the relay device 84 becomes deenergized to disconnect the voltage source 82 from the ON input of the memory device 80. A conductor 87 is directly connected between the voltage source 82 through the contactor of the relay device 84 to a third input of the NOR logic element 76 for a purpose as will be later described.

The output of the NOR logic element 76 is connected to an input of a pulse counter device 88 which is operative to count a predetermined number of applied input pulses and thereafter provide a single output pulse through an output terminal 90 which is connected to the OFF input of each of the memory devices 34, 46, 50, 54 and 60 and further is connected through a conductor 92 to the OFF input of the memory device 80.

In the operation of the motor control apparatus as shown in the drawing, the output pulse or signal from the pulse counter device 88 is operative to cause each of the memory devices 34, 46, 50, 54, 60 and 80 to be reset and operative in its OFF condition such that an output signal is supplied by each of the memory devices 34, 46 and 50 to the respective timer devices 40, 48 and 52. Therefore, each of the timer device does not supply a control signal to each of the NOR logic devices 42 and 44. However, an output signal is supplied by the memory device 80 through its upper output terminal 78 to an input of the NOR logic device 76, which is operative as a gating device relative to output pulses from the pulse source 74. When the output signal from the upper output terminal 78 is applied to an input of the NOR logic device 76, this blocks or prevents the output pulses from the pulse source 74 from reaching the input of the pulse counter device 88.

The same output signal from the pulse counter device 88 is operative to set the memory devices 54 and 60 in their OFF condition of operation such that the memory device 54 supplies a unit value output signal through its terminal 56 to an input of the NOR logic device 42 and supplies a zero value output signal through its output terminal 58 to an input of the NOR logic device 44, thereby preventing the NOR logic device 42 from providing an output signal. On the other hand, the memory device 60 provides a unit value output signal through its output terminal 62 to the NOR logic device 44 and provides a zero value output signal through its terminal 64 to an input of the NOR logic device 42, thereby preventing the NOR logic device 44 from providing an output signal.

With the mill motor 72 in operation and the strip 16 moving through the rolling mill 10, any error present in the strip thickness is sensed by the thickness gauge 20 and is supplied to the signal magnitude sensing devices 22, 24 and 26 and to the signal polarity sensing device 28. Assume for the purpose of example that the strip thickness error is between 1 and 2%, such that only the signal magnitude sensing device 22 responds to the error signal and the signal magnitude sensing devices 24 and 26 do not respond to the error signal. In addition, assume for purposes of illustration that the strip thickness error is such that the actual strip thickness is greater than the desired or reference strip thickness, such that the signal polarity sensing device 28 is operative to provide an output signal through its output terminal 30 to the upper or ON input of the memory device 54. The output signal from the signal magnitude sensing device 22 causes the memory device 34 to operate in its ON condition to thereby no longer energize an input of the first timer device 40. The timer device 40 will now provide a unit value output signal to each of the NOR logic devices 42 and 44 after a first predetermined time period, such as for example one second. The output signal from the signal polarity sensing device 28 through its output terminal 30 causes the memory device 54 to operate in its ON condition of operation such that the output terminal 56 now receives a zero value control signal which it applies to an input of the NOR logic device 42, and the output terminal 58 now receives a one value output signal which it applies to an input of the NOR logic device 44.

Until the one value control signal from the first timer device 40 is provided at the end of the one second timing period and simultaneously the one value control signal from the memory device 54 is also not provided the NOR logic device 42 now is able to provide an output signal to the DOWN relay device 66 in that all of its inputs are now not energized by one value control signals or in other words are energized with zero value control signals. This causes the contacts of the relay device 66 to energize for the one second time period the screw motor 18 in a direction to decrease the spacing between the upper roller 12 and the lower roller 14 of the rolling mill 10.

After the desired error correction period, which in the present assumed illustration is a time period of one second, the one value control signal from the first timer device 40 appears to an input of each of the NOR logic devices 42 and 44 to thereby terminate the energization of the relay device 66 and to cause it to return to its position as shown in the drawing. This completes a dynamic braking circuit between the screw motor 18, armature and the dynamic braking resistor 86 which results in the energization of the dynamic braking resistor 86 until the screw motor 18 stops its operation. The relay device 84 is operated by the resulting voltage drop across the dynamic braking resistor 86 to cause the voltage source 82 now to energize the ON input of the memory device 80 to cause the latter memory device 80 to become operative in its ON condition of operation such that the one value output signal is no longer supplied through the terminal 78 to an input of the NOR logic device 76. The voltage source 82 is connected through the conductor 86 to a third input of the NOR logic device 76 to effectively prevent it from passing the output pulses from the pulse source 74 to the pulse counter device 88. After the screw motor 18 has stopped its motion due to the effect of the dynamic braking action, the relay device 84 again becomes deenergized to disconnect the voltage source 82 from the third input to the NOR logic device 76, such that the output pulses from the pulse source 74 now are applied to the pulse counter device 88.

After a predetermined number of pulses, for example, six pulses have been counted by the pulse counter device, which six pulses correspond substantially to the transport time delay of a given portion of the strip 16 passing from the rolling mill 10 to the thickness gauge 20 and such that the thickness error corrective action can be measured by the thickness gauge 20, an output pulse is supplied by the pulse counter device to the OFF input of the memory device 80 through the conductor 92 which causes the memory device 80 to return to its OFF condition of operation and to again provide an output one value signal through its terminal 78 to an input of the NOR logic device 76 to thereby prevent additional pulses from the pulse source 74 from being applied to the pulse counter device 88. This same output pulse from the pulse counter device 88 is operative to reset the pulse counter device 88 as well known to persons skilled in this particular art. This same output pulse is further operative to reset each of the memory devices 34, 46, 50, 54 and 60. The control input of the first timer device is now again energized by the memory device 34, the second and third timer devices respectively 48 and 52 continue to be energized by their respective memory devices 46 and 50. The memory device 54 is returned to its OFF condition of operation such that the output terminal 56 provides a unit value control signal to the NOR logic device 42 and the output terminal 58 provides a zero value control signal to the NOR logic device 44. The memory device 60 remains in its OFF condition of operation with the output terminal 62 providing a unit value control signal to the NOR logic device 44 and the output terminal 64 providing a zero value control signal to the NOR logic device 42.

Thusly, it will be seen that the error signal caused the DOWN relay device 66 to be energized for a time period which varies in length in accordance with the magnitude of the error signal provided by the thickness gauge 20. In the illustration, the error signal was operative to provide only a one second energization of the screw motor 18, however if the error signal had been between 2 and 5% the second timer device 48 would have been operative to provide a greater error correction period, for example a two second correction period. The lockout signal connection from the lower output terminal 47 of the memory device 46 to the lockout input of the first timer device 40 is operative to prevent an output signal from the timer device 40 when the memory device 46 is operative in its ON condition of operation. Similarly, the lockout signal connection from the lower output terminal 51 of the memory device 50 to a lockout input of each of the timer devices 40 and 48 is operative to prevent an output signal from each of the timer devices 40 and 48 when the memory device 50 is operating in its ON condition of operation. If the error signal from the thickness gauge 20 had been above 5%, the signal magnitude sensing device 26 would have caused the third timer device 52 to energize the DOWN relay device 66 for a five second time period. In this regard it should be noted that the first timer device 40 and the second timer device 48 have their lockout inputs respectively energized by any unit value signal from the memory device 50, output terminal 51 as provided when that memory device 50 is operative in its ON condition of operation, such that only the larger five second time period provided by the third timer device 52 is controlling.

The polarity of the error signal corresponding to the actual strip thickness being one of greater or smaller than the desired or reference strip thickness is operative with the polarity sensing device 28 to cause one or the other of the relay devices 66 and 70 to be operative. In the provided illustration, the DOWN relay device 66 was energized in that the error signal corresponded to an actual strip thickness greater than the desired or reference strip thickness. After the screw motor 18 is energized for the desired predetermined time period, it is stopped by a dynamic braking circuit which in turn is operative to block the output pulses from the pulse source 74 until after the screw motor 18 stops its movement. Then the signal pulses from the pulse source 74 and corresponding to the movement of the strip 16 as sensed through the operation of the rolling mill and the mill motor 72 are applied to a pulse counter device for again resetting the control apparatus shown in the drawing.

Thusly, the system as shown in the drawings is operated by a thickness error signal which is supplied to a group of signal comparators or signal magnitude sensing devices, each of which responds to a different magnitude of error signal, and the direction of the error signal is sensed. When one of the voltage comparators responds to the error signal, it controls its particular timing circuit such that the screws are jogged or energized for a given length of time in a direction determined by the polarity or direction of the thickness error. When the jogging operation is completed, a pulse counter is energized by signal pulses provided in accordance with the operating speed of the rolling mill 10 or the movement of the strip 16. These latter pulses provide a measurement of the strip movement along the pass line through the rolling mill 10. When the counter indicates that the proper strip movement after the screw motor has stopped its correcting motion has been provided to allow all of the strip thickness corrections that are made to reach the thickness gauge 20, the pulse counter device 88 sends an output signal to reset the timing circuits through their respective control memory devices for another jogging operation if the strip thickness error has not been removed. Thusly, the screw motor 18 is jogged for a given time corresponding to the magnitude and direction of the thickness error and is then allowed to remain inactive until the corrective results of this jogging movement have been measured. If the screw correction movement provided in this manner is not sufficient and a thickness error is still present, a subsequent jogging operation is initiated and this is repeatedly done until the strip thickness error is removed. It should be readily understandable that any desired number of signal magnitude sensing devices can be provided, although for the purpose of illustration only three such devices have been shown. It should be further noted that the screw motor 18 is operative in a constant voltage screw control circuit arrangement. The motor control apparatus of the present invention is equally operative with a variable voltage screw control type of apparatus or on a motor operated field rheostat arrangement.

Although the present invention has been described with a certain degree of particularity, it should be understood that the present disclosure has been made only by way of example and that numerous changes in the details of construction and the combination and arrangement of parts may be resorted to without departing from the scope and spirit of the present invention.

I claim as my invention:

1. In control apparatus for controlling the operation of a machine device in accordance with an operation error signal, the combination of a first signal sensing device responsive to a first predetermined value of said error signal, a second signal sensing device responsive to a second predetermined value of said error signal, a first control period providing device operative with said first signal sensing device for providing a first control period having a first time duration when said first signal sensing device responds to a first predetermined value of said error signal, a second control period providing device operative with said second signal sensing device for providing a second control period having a second time duration greater than said first time period when said second signal sensing device responds to a second predetermined value of said error signal greater than said first predetermined value, a condition sensing device operative with said machine device for providing a control signal in accordance with an operating condition of said machine device, and a machine device controlling member operative with said machine device to correct said error signal, with said machine device controlling member being responsive to one of said first and second control periods and additionally responsive to said control signal for controlling the correction of said error signal.

2. In motor control apparatus operative with a motor having an armature and responsive to an operation error signal for determining the operation of said motor, the combination of a first signal sensing device responsive to a first predetermined value of said error signal, a second signal sensing device responsive to a second predetermined value of said error signal, a first control signal providing device operative with said first signal sensing device for providing a first control signal having a first time control period in accordance with said first signal sensing device responding to a first predetermined value of said error signal, a second control signal providing device operative with said second signal sensing device for providing a second control signal having a second time control period greater than said first time period and in accordance with said second signal sensing device responding to a second predetermined value of said error signal greater than said first predetermined value, motor operation sensing means operative with said motor for providing a third control signal in accordance with a predetermined operating condition of said motor armature, with one of said first and second control signal providing devices being responsive to said third control signal for controlling the provision of a control signal by said one signal providing device, and a control member responsive to the latter control signal for correcting the operation error of said motor.

3. In strip thickness control apparatus, the combination of a strip thickness sensing device for providing an error signal in accordance with the error difference between the actual strip thickness and a predetermined desired thickness, first control signal means responding to a first predetermined value of said error signal for providing a first control signal having a first predetermined time control period, second control signal means responding to a second predetermined value of said error signal greater than said first predetermined value for providing a second control signal having a second predetermined time control period greater than said first time control period, strip movement sensing means operative with the strip for providing a third control signal in accordance with the movement of said strip, and strip thickness controlling means responsive to one of said first and second control signals and operative with said strip to provide a correction for said error difference at time intervals determined by said third control signal.

4. In strip thickness control apparatus, the combination of a strip thickness sensing device for providing an error signal in accordance with the error difference between the actual strip thickness and a predetermined desired thickness, first control signal means responding to a first predetermined value of said error signal for providing a first control signal having a first predetermined time control period, second control signal means responding to a second predetermined value of said error signal greater than said first predetermined value for providing a second control signal having a second predetermined time control period greater than said first time control period, third control signal means responding to the polarity of said error signal for providing a third control signal when said error signal is less than a predetermined reference value and for providing a fourth control signal when said error signal is greater than said reference value, strip movement sensing means operative with the strip for providing a fifth control signal in accordance with the movement of said strip, and strip thickness controlling means responsive to one of said first and second control signals and further responsive to one of said third and fourth control signals to correct said error difference in a direction to substantially eliminate the strip thickness error, with the schedule of the error correction by said strip thickness controlling means being determined by said fifth control signal.

References Cited in the file of this patent

UNITED STATES PATENTS

| | | |
|---|---|---|
| 1,969,536 | Winne | Aug. 7, 1934 |
| 2,664,557 | Sargrove | Dec. 29, 1953 |
| 2,708,254 | Macaulay et al. | May 10, 1955 |
| 2,897,638 | Maker | Aug. 4, 1959 |
| 2,933,626 | Giboney et al. | Apr. 19, 1960 |